United States Patent [19]

Hoff

[11] 4,211,671

[45] Jul. 8, 1980

[54] OLEFIN POLYMERIZATION CATALYST

[75] Inventor: Glen R. Hoff, Naperville, Ill.

[73] Assignee: Standard Oil Company (Indiana), Chicago, Ill.

[21] Appl. No.: 964,034

[22] Filed: Nov. 27, 1978

[51] Int. Cl.$^2$ .............................. C08F 4/64; C08F 4/68
[52] U.S. Cl. ........................... 252/431 N; 252/429 C; 252/430; 526/124; 526/125
[58] Field of Search ................ 252/429 C, 430, 431 N

[56] References Cited

U.S. PATENT DOCUMENTS

| 3,734,899 | 5/1973 | Fodor | 252/429 C X |
| 3,773,734 | 11/1973 | Cucinella et al. | 252/431 N X |
| 3,784,481 | 1/1974 | Lassau et al. | 252/431 N X |
| 4,113,654 | 9/1978 | Mayr et al. | 252/431 N X |

*Primary Examiner*—Patrick Garvin
*Attorney, Agent, or Firm*—William C. Clarke; William T. McClain; William H. Magidson

[57] ABSTRACT

Alpha-olefin polymerization catalyst comprising (A) a solid component which is the reaction product of components comprising (1) an alkyl aluminum halide and (2) a reaction product prepared by reacting components comprising a magnesium compound and a Group IVB or VB amide compound of the general formula $M(NR_2)_nL_{4-n}$ wherein M is a Group IVB or VB metal, R is an alkyl or aryl group, L is a non-amine ligand, and n is a number of from 1 to 4; and (B) an organo aluminum promoter.

18 Claims, No Drawings

OLEFIN POLYMERIZATION CATALYST

BACKGROUND OF THE INVENTION

This invention relates to alpha-olefin polymerization catalysts, and more particularly to catalysts comprising the reaction product of an alkyl aluminum halide and the reaction product of a titanium (IV) amide compound and a magnesium (II) alkoxide or oxyhalide.

In the lower pressure polymerization of alpha-olefins substantial economic benefits can be derived by carrying out the polymerization in the presence of highly active catalysts such that polymeric products are produced in yields high enough to eliminate the need for removal of catalyst residues. To this end catalyst comprising an organoaluminum promoter and a Group IV metal amide compound have been proposed.

One such catalyst, described in Belgium Patent No. 661,389 to Farbwerke Hoechst A. G. consists of a trialkyl or triaryl aluminum compound, and a compound of the formula $R_{4-n}M(NR')_2$ in which M is a Group IV metal, R is a hydrocarbon or hydrocarbonoxy group, R' is hydrogen or an alkyl or aryl group and n is 1-4. However, the catalyst has the drawback that residues need to be removed. For example, the titanium compound $(isobutoxy)_2 Ti(NCH_3)_2$ in heavy oil was cooled to $-5°$ C. and then activated with an organo aluminum promoter at $65°$ C. and employed in the polymerization of alpha-olefins. After polymerization, an organo alcohol is added to the mixture, the polymer is separated by filtration, washed with water and acetone and dried at $100°$ C. A similar catalyst and process is described in Belgium Patent No. 664,699.

Another such catalyst, described in Japanese Patent 15,980 (1965), is a binary catalyst system consisting of organo-aluminum compounds and $Ti(NR_2)_nX_{4-n}$ where R is an alkyl group, X is halogen and n is 1-4. After polymerization, the product is washed with HCl methyl alcohol.

Another such catalyst described by Koide, et al. in the *Journal of Polymer Sciences* (Polymer Chem) 11:3161 (1973) polymerizes styrene but the polymerization activity of the catalyst system, $Ti(N Et_2)_4$-$AlMe_3$, is described as not very great. It was found that the polymer yield was dependent on the Al/Ti molar ratio with an optimum activity at an Al/Ti molar ratio of 1.5 or thereabouts. When the Al/Ti molar ratio was above 4, no polymerization occurred.

Accordingly, as can be appreciated from the foregoing, it would be desirable to improve the above catalysts of the type wherein a Group IVB metal and nitrogen compound is involved as a catalytic component while retaining the desirable polymerization and solubility properties thereof and avoiding the necessity of removing the catalyst residues.

It is an object of this invention to provide such an improved catalyst and a method for the preparation thereof. A further object of the invention is to provide for the polymerization of alpha-olefins in the presence of the invented catalysts. A further object of this invention is to provide a catalyst which is sufficiently active that polymeric product is produced in yields high enough to eliminate the need for removal of catalyst residues. Other objects of the invention will be apparent to persons of skill in the art from the following description and the appended claims.

It has now been found that the objects of this invention can be achieved by reacting a magensium (II) compound with a Group VIB or VB amide compound under conditions such that an easily handled reaction product is obtained, and then reacting this product with an alkylaluminum compound to form a solid catalyst component. Similar to the catalyst comoponents of Belgium Patents Nos. 661,389; 664,699; Japanese Patent No. 15,980, the invented components can be promoted with an organoaluminum promoter and employed in the polymerization of alpha-olefins to polymers having a relative broad molecular weight distribution. However, sufficiently high yields are obtained with the catalyst of the instant invention that separation of catalyst residues from the polymeric product is unnecessary.

SUMMARY OF THE INVENTION

Alpha-olefin polymerization catalyst comprising (A) a solid component which is the reaction product of components comprising (1) an alkyl aluminum halide and (2) a reaction product prepared by reacting components comprising a magnesium compound and Group IVB or VB amide compound of the general formula $M(NR_2)_nL_{4-n}$ wherein M is the Group IVB or VB metal, N is nitrogen, R is an alkyl or aryl group, L is a non-amine ligand, and n is a number of 1 to 4; and (B) an organo aluminum promoter.

The precise structure and composition of the active component of the invented catalyst is not presently known although it appears that the solid obtained from the reaction of the transition metal compound mixture with the organoaluminum compound is a system as opposed to a physical mixture of individual transition metal compounds. In view of this uncertainty as to the composition and structure of the active component, catalyst amounts and activities are expressed herein in terms of a reaction product of components comprising (1) an alkyl aluminum halide and (2) a reaction product prepared by reacting components comprising a magnesium (II) compound and a Group IVB or VB amide compound of the general formula $M(NR_2)L_{4-n}$ wherein M, N, R, L and n are as stated above.

DESCRIPTION OF THE INVENTION

Briefly, the catalysts of this invention comprise (A) a solid component which is the reaction product of components comprising (1) an alkyl aluminum halide and (2) a reaction product prepared by reacting components comprising a magnesium (II) compound and a Group IVB or VB amide compound of the general formula $M(NR_2)_nL_{4-n}$ wherein M is the Group IVB or VB metal, N is nitrogen, R is an alkyl or aryl group, L is a non-amine ligand and n is a whole number from 1 to 4; and (B) an organo aluminum promoter.

Alkylaluminum halides useful in preparation of the solid component, (A), of the invented catalysts include compounds represented by the structural formula $AlR_nX_{3-n}$ wherein Al is aluminum, R is an alkyl radical of 1 to about 20 carbon atoms, and preferably 1 to about 6 carbon atoms, X is halogen, preferably chlorine or bromine, and n is greater than 0 and less than 3, and preferably from about 1 to about 2. Examples of such compounds include dimethyl-, diethyl-, diisobutyl-, di-n-hexyl-, and diisooctylaluminum chlorides and bromides; methyl-, ethyl-, isobutyl-, n-hexyl-, and isooctylaluminum sesquichlorides, sesquibromides, dichlorides, and dibromides. Combinations of such compounds also can be utilized. Alkylaluminum halides which are preferred are alkylaluminum dichlorides wherein the alkyl radical contains from 1 to about 6 carbon atoms, and particularly, ethylaluminum dichloride.

Magnesium (II) compounds, useful in preparation of the (A) component of the invented catalysts include alkoxides, alkoxyhalides, halides, oxyhalides or oxides. Alkoxide compounds include compounds of the formula $Mg(OR_1)(OR_2)$ wherein $R_1$ and $R_2$ are the same or different and are alkyl radicals of 1 to about 20 carbon atoms. Examples include $Mg(OCH_3)_2$, $Mg(OC_2H_5)_2$, $Mg(OC_4H_9)_2$, $Mg(OCH_3)(OC_2H_5)$, $Mg(OC_2H_5)(OC_5H_{11})$, and so forth. Mixtures also can be employed. Preferred magnesium (II) alkoxides are those compounds in which $R_1$ and $R_2$ in the above formula are the same and are lower alkyl radicals of 1 to about 6 carbon atoms such as methyl, ethyl, propyl, butyl, pentyl and hexyl. More preferably, the magnesium (II) alkoxide is magnesium (II) ethoxide.

The amide component of the invented catalysts comprises a metal selected from the group consisting of the metals of Group IVB and VB of the Periodic Table of Elements. The pertinent Periodic Table of Elements may be found on the inside of the back cover of HANDBOOK OF CHEMISTRY AND PHYSICS, 46th edition, Robert C. Weast, editor, Chemical Rubber Company, Cleveland, Ohio (1965). The preferred Group IVB metal is titanium although zirconium can be used. The preferred Group VB metal is vanadium.

Useful titanium (IV) amide compounds include compounds which are liquids at reaction temperatures having the formula $Ti(NR_2)_nL_{4-n}$ wherein R is an alkyl radical of 1 to about 20 carbon atoms and preferably 1 to about 6 carbon atoms, L is halogen and preferably chlorine or bromine, and n is greater than 0 and less than 4. Examples of useful titanium (IV) compounds include $Ti[N(CH_3)_2]Br_3$, $Ti[N(C_2H_5)_2]Cl_3$, $Ti[N(C_6H_{13})_2]I_3$, $Ti[N(C_{10}H_{21})_2]Cl_3$, $Ti[N(CH_3)_2]_2Cl_2$, $Ti[N(C_3H_7)_2]_2Br_2$, $Ti[N(C_5H_{11})_2]_2Cl_2$, $Ti[N(C_9H_{19})_2]_2Cl_2$, $Ti[N(CH_3)_2]_3Cl$, $Ti[N(C_4H_9)_2]_3Cl$, $Ti[N(C_8H_{17})_2]_3I$ and $Ti[N(C_{12}H_{25})_2]_3Cl$. Mixtures can also be employed. It is convenient to prepare the titanium (IV) amide by reaction of appropriate titanium compounds in amounts and under conditions known to persons skilled in the art. Examples of other useful compounds are analogues of zirconium and vanadium.

The solid component, (A), of the invented catalysts is prepared by reacting the above-described magnesium (II) alkoxide and liquid Group IVB or VB amide halide components to form a product which is then treated with the above-described alkylaluminum halide component to form a solid catalyst component.

In somewhat greater detail, the preferred magnesium (II) alkoxide-titanium (IV) amide halide reaction product is prepared by combining the magnesium (II) alkoxide and liquid titanium (IV) amide halide components or the magnesium (II) alkoxide and appropriate liquid titanium tetrahalide and solid or liquid titanium tetraamide components in the presence or absence of a diluent and the substantial absence of water, oxygen and other catalyst poisons, and reacting such components at a temperature and for a time sufficient to form a reaction product. The reaction can be carried out at any convenient temperature at which the components employed will react. Preferably, reaction temperatures range from about 0° to about 250° C., and more preferably, from about 60° to about 170° C. Reaction times preferably range from several minutes to several hours, and more preferably from about ½ to about 5 hours. The magnesium (II) alkoxide component and titanium (IV) amide halide component, or, when employed, titanium tetraamine and tetraalkoxide components are combined in amounts such that the molar ratio of elemental titanium to elemental magnesium ranges from about 0.1:1 to about 10:1, and preferably from about 0.5:1 to about 2:1.

The thus formed magnesium (II) alkoxide-titanium (IV) amide halide reaction product is then combined with an alkylaluminum halide component, again in the substantial absence of catalyst poisons, and reacted at a temperature and for a time sufficient to form a solid catalyst component. Preferably, the alkylaluminum halide component is employed in the form of a solution in an inert hydrocarbon diluent, the diluent serving to make the component non-pyrophoric.

Suitable diluents include those materials in which the liquid, magnesium (II) alkoxide-titanium (IV) amide halide reaction product and/or the alkylaluminum halide component are at least partially soluble and which are liquid at reaction temperatures. Preferred diluents are the alkanes, such as hexane, heptane, octane, nonane and decane, although a variety of other materials including cycloalkanes such as cyclohexane, aromatics such as benzene, and ethylbenzene, and halogenated and hydrogenated aromatics such as chlorobenzene, ortho-dichlorobenzene, tetrahydronaphthalene, and decahydronaphthalene also can be employed. Prior to use, the diluent should be purified, such as by percolation through silica gel and/or molecular sieves, to remove traces of water, oxygen, polar compounds, and other materials capable of adversely affecting catalyst activity.

As indicated above, the magnesium (II) alkoxidetitanium (IV) amide halide reaction product and the alkylaluminum halide component are reacted at a temperature and for a time sufficient to yield a solid catalyst component. Suitably, temperatures range from about −40° to about 250° C., and preferably, from about 0° to about 170° C. Suitable reaction times range from about ½ to about 25 hours, with about 1¼ to about 8 hours being preferred.

In combining the reaction product with alkylaluminum halide, the latter is employed in an amount which is at least effective to halide both the magnesium and the titanium present in the reaction product. This amount will vary depending upon the halogen content of the alkylaluminum halide component and the titanium (IV) amide halide component employed in preparation of the reaction product, and is such that total mols of halogen contained in such components equals or exceeds the sum of four times the molar amount of elemental titanium employed plus two times the molar amount of elemental magnesium employed. Preferably the alkylaluminum halide is used in an amount such that total mols of halogen equals from 1 to about 5 times the aforesaid sum. Greater amounts of the alkylaluminum halide component also can be employed although there is a gradual decrease in activity with increasing amounts of the component.

As indicated above, the invented catalysts are prepared in the substantial absence of water, oxygen, and other catalyst poisons. Conveniently, such materials are excluded by carrying out the preparation under an atmosphere of nitrogen, argon or other inert gas. An inert gas purge can serve the dual purpose of excluding external contaminants during the preparation and removing undesirable reaction by-products resulting from preparation of the reaction product. Purification of any diluent to be employed in the second preparative step in the manner described above also is helpful in this regard.

As a result of the above-described preparation there is obtained a solid catalyst component which can be promoted with an organometallic component and employed in the low pressure polymerization of alpha-olefins. Useful organometallic components include any of the materials commonly employed as promoters for olefin polymerization catalyst components containing compounds of the Group IVB, VB or VIBA metals. Examples of such promoters include the Group IA, IIA, IIB, IIIA and IVA metal alkyls, hydrides, alkylhydrides and alkylhalides, such as alkyllithium compounds, dialkylzinc compounds, trialkylboron compounds, trialkylaluminum compounds, and alkylaluminum halides and hydrides. Mixtures also can be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride. Organometallic promoters which are preferred for use according to this invention are the Group IIIA metal alkyls and dialkylhydrides having 1 to about 20 carbon atoms per alkyl radical. More preferably, the promoter is a trialkylaluminum compound having 1 to about 6 carbon atoms per alkyl radical. Most preferably, the organometallic promoter is triethylaluminum or triisobutylaluminum.

The organometallic promoter is employed in an amount which is at least effective to promote the polymerization activity of the solid component of the invented catalysts. Preferably, at least about three parts, by weight, or promoter are employed per part, by weight, of solid component, although higher ratios, such as 10:1, 25:1, 100:1 or higher also are suitable and often give highly beneficial results. In slurry polymerization processes, a portion of the promoter can be employed to pretreat the polymerization medium if desired.

The promoted catalyst component described above is employed in alpha-olefin polymerization processes wherein at least one polymerizable alpha-olefin is contacted with the catalyst under polymerizing conditions. Both slurry and solventless processes are contemplated herein. The polymerization temperature using a solventless process should be high enough to give an adequate polymerization rate but not too large to raise the pressure above that which is normally used in this type of process, i.e., up to about several hundred p.s.i.g., or to soften the polymer bed contained in the reactor.

In the slurry or particle form process, the polymerization is carried out at a temperature such that the polymer as formed is a solid in the polymerization reactor. The preferred polymerization temperature is about 40° C. to about 110° C. In a vapor phase process wherein little or no liquid medium is used, the preferred temperature range is from about 40° C. to about 130° C. and, more preferably, from about 60° C. to about 120° C.

Alpha-olefins which can be polymerized using the invented catalysts include ethylene, propylene, butene-1, pentene-1, 4-methylpentene-1, and mixtures thereof as well as mixtures with dienes such as butadiene and isoprene. Preferably, the invented catalysts are employed in the polymerization of ethylene or mixtures thereof with up to about 20 mol percent of a higher alpha-olefin or a diene. Most preferably, the invented catalysts are employed in the polymerization of ethylene.

It is of particular importance for best results that the alpha-olefin be substantially free of catalyst poisons. Accordingly, it is preferred to use polymerization grade material which has been passed through a molecular sieve prior to use to remove any remaining traces of moisture, oxygen, carbon dioxide and polar organic compounds.

The organic liquid employed as the polymerization medium in the particle form process can be an alkane or cycloalkane such as butane, isobutane, pentane, hexane, heptane or cyclohexane, or a hydrogenated aromatic compound such as tetrahydronaphthalene or decahydronaphthalene, or a high molecular weight liquid paraffin or mixtures of paraffins which are liquid at the polymerization temperature, or an aromatic hydrocarbon such as benzene, toluene or xylene or a halogenated aromatic compound such as chlorobenzene, chloronaphthalene or ortho-dichlorobenzene. The nature of the medium is subject to considerable variation, although the medium employed should be liquid under polymerization conditions and relatively inert. Other media which can be used include ethylbenzene, isopropylbenzene, ethyltoluene, n-propylbenzene, diethylbenzenes, mono- and dialkylnaphthalenes, n-octane, isooctane and methylcyclohexane. Preferably, a hexane or a butane is employed. For best results, the polymerization media employed in particle form polymerization should be purified to remove traces of moisture, oxygen, carbon dioxide and polar organic compounds prior to use by contacting the medium, for example, in a distillation procedure, with an organoaluminum compound, for example, triethylaluminum, prior to or after percolating the medium through silica gel or molecular sieves.

The polymerization time is not critical and will usually be on the order of thirty minutes to several hours in batch processes. Contact times of from one to four hours are commonly employed in autoclave-type systems. When the polymerization process is a continuous system, wherein polymerization medium, if any, and excess monomer are returned to a charging zone and catalyst replenished and additional monomer introduced, the contact time in the polymerization zone can be regulated as desired, and in some cases, contact times of one-half to several hours will suffice. Preferably, the total pressure range for the polymerization process is about atmospheric to over 1000 p.s.i.g. More preferably, the polymerization pressure is greater than about 100 p.s.i.g. and most preferably, the polymerization pressure is about 200 p.s.i.g. or higher.

The catalysts of this invention, when employed for the polymerization of olefins, typically are used with hydrogen to control molecular weight. Solid polymers having molecular weights greater than about 50,000 and less than about 3,000,000 result thereby. The amount of hydrogen to be used depends upon the molecular weight to be obtained and can be easily determined by those skilled in the art based on the examples appearing hereinbelow.

Polyolefins prepared in the presence of the catalysts of this invention exhibit a relatively broad molecular weight distribution, have very few fines and can be processed by a variety of techniques, including extrusion, mechanical melting, casting, and molding, to form a variety of useful articles including films, sheets, plates, and molded objects.

Polymer fines, material less than 100 microns in size, are a problem in polymerization reactor systems. Because of their small size, fines can be carried out of the polymerization reactor into associated equipment such as heat exchangers for solvent recovery. The particles can pack in the heat exchangers and reduce the efficiency of the exchangers. Also, polymer fines typically contain active catalyst and the polymerization reaction can continue outside of the reactor. The growing polymer can cause plugging of the heat exchanger and recycle lines. The polymer made outside of the polymerization reactor is made at a lower temperature and typically has a higher molecular weight. Accordingly, if the fines are transported back into the reactor, high molecular weight gels may be caused to form. These gels can affect adversely the properties of the polymer, being especially a problem when the polymer is being formed into a film.

As used herein, MI refers to polyolefin melt index as determined according to A.S.T.M. D-1238-65T Condition E and represents a measure of polyolefin molecular weight and processability. $MF_{10}/MF_1$ is employed herein as an indication of polyolefin molecular weight distribution and is defined as the ratio of polymer melt index determined according to A.S.T.M. D-1238-65T Condition F to melt index determined according to A.S.T.M. D-1238-65T Condition E.

The following examples illustrate the present invention and are not to be construed as limiting the scope thereof.

EXAMPLE I

Into a 300 ml round-bottom flask equipped with mechanical stirrer and nitrogen purge were placed 1.1 g magnesium ethylate, 1.1 g tetrakis(diethylamino)-titanium (IV), and 80 ml nonane. These were heated 24 hours at the reflux temperature of nonane and then allowed to cool. Fifty milliliters of hexane were added, followed by thirty-one milliliters of an ethylaluminum dichloride solution (25 weight percent in hexane) which caused immediate precipitation. The following day the catalyst suspension was heated one hour at the reflux temperature of the solvent and allowed to cool. A 4.6 ml sample was withdrawn and diluted with 40 ml hexane to make the catalyst.

EXAMPLE II

A series of polymerization runs were conducted using the catalyst component of Example I according to the following procedure. An amount of catalyst component and promoter were first stirred in 250 ml polymerization grade hexane in a 500 ml stainless steel autoclave reactor. Hydrogen and polymerization grade ethylene were then fed into the reactor. Hydrogen pressures were varied from run to run as reported in Table I.

Ethylene was added in amounts sufficient to maintain a total pressure of 300 p.s.i.g. within the reactor during the polymerization. The polymerizations were conducted at 180° F. over a period of one hour after which the ethylene was vented from the reactor to terminate the polymerization. The resulting slurry was poured into a Buchner funnel to collect the solid which was then dried at 60° in a vacuum oven. The dried polymer was weighed and melt indices were determined according to A.S.T.M Test D-1238-65T, conditions E and F. Results are given in Table I.

TABLE I

| Run | Catalyst Amount mg | Triethylaluminum mg | Hydrogen psi | Temp °F. | Yield grams |
|---|---|---|---|---|---|
| 1 | 6.75 | 17.6 | 90 | 180 | 34.4 |
| 2 | 7.2 | 17.6 | 100 | 180 | 20.5 |
| 3 | 6.75 | 22 | 90 | 180 | 33.5 |
| 4 | 6.75 | 22 | 100 | 180 | 39.5 |
| 5 | 1.12 | 44 | 100 | 180 | 32.8 |

| Run | Melt Index | $MF_{10}/MF_1$ |
|---|---|---|
| 1 | 0.08 | — |
| 2 | 0.15 | 31.3 |
| 3 | 0.14 | 32.1 |
| 4 | 0.36 | 32.2 |
| 5 | 0.92 | 35.2 |

EXAMPLE III

Into a 300 ml flask equipped with mechanical stirrer and nitrogen purge were placed 3.24 g magnesium ethylate, 8.41 g tetrakis(diethylamino)titanium (IV), and 20 ml nonane. These were heated at the reflux temperature. After 28 hours some small brown particles were present. The mixture was allowed to cool and 89 ml hexane were added. The stirred mixture was heated to 45° C. and 23 ml of a 3.37 molar ethylaluminum dichloride (EADC) solution in hexane was added over a thirty minute period. After a withdrawal of 3.5 ml of the mixture (Catalyst A, diluted with 50 ml hexane) an additional 37 ml of the EADC solution were added over a thirty minute period at about 55° C. A 3.6 ml sample (Catalyst B, diluted with 50 ml hexane) was taken and 30 ml EADC solution was added intermittantly over a one-hour period. After a 2 ml sample of the mixture was taken (Catalyst C) an additional 40 ml EADC solution was added to make Catalyst D.

EXAMPLE IV

A series of ethylene polymerizations were conducted using the catalyst components of the previous example according to the following procedure. The amount of catalyst component specified in Table I and 40 mg triethylaluminum were added to a stirred 500 ml stainless steel autoclave reactor containing 260 ml hexane and 40 mg triethyl aluminum. The reactor was at 180° F. and contained the amount of hydrogen specified in Table I and enough polymerization grade ethylene was fed to the reactor to maintain the total pressure at 300 p.s.i.g. throughout the polymerization. After one hour the ethylene and other gases were vented from the reactor and the reactor opened to terminate the polymerization. The resulting slurry of polyethylene in hexane was poured into a Buchner funnel to remove the hexane and the solid product was then dried at 65° C. in a vacuum oven. The dried polymer was weighed and melt index was determined according to ASTM-D 1238-65T, Condition E. Polymer fines (percent passing through a 70 mesh (U.S. Sieve) screen) were determined by shaking a 10 g sample of polymer on the screen for five minutes and weighing the material passing through to the pan.

TABLE II

| Catalyst | EADC Content to MgOC$_2$H$_5$ | Run | Catalyst Amount mg | Hydrogen psig | Yield grams | Melt Index |
|---|---|---|---|---|---|---|
| A | 2.7 | 6 | 9.0 | 70 | 10.1 | 0.4 |

TABLE II-continued

| Catalyst | | RUN | | | | |
|---|---|---|---|---|---|---|
| | | 7 | 9.0 | 80 | 17.2 | 1.9 |
| | | 8 | 9.0 | 100 | 15.1 | 6.2 |
| B | 7.2 | 9 | 2.0 | 70 | 40.8 | 0.48 |
| | | 10 | 1.3 | 70 | 36.4 | 0.47 |
| C | 11 | 11 | 1.2 | 70 | 34.8 | 0.70 |
| | | 12 | 0.84 | 70 | 21.2 | 0.84 |
| D | 16 | 13 | 1.0 | 70 | 18.2 | 0.36 |
| | | 14 | 1.5 | 80 | 20.5 | 0.86 |

| Catalyst | RUN | Polymer MF$_{10}$/MF$_1$ | Fines % |
|---|---|---|---|
| A | | | |
| | 6 | — | — |
| | 7 | 26 | 17 |
| | 8 | — | — |
| B | 9 | 36 | 10 |
| | 10 | 30 | — |
| C | 11 | 38 | 2 |
| | 12 | 40 | — |
| D | 13 | 39 | 1 |
| | 14 | 38 | — |

As shown in Table II, the amount of polymer fines decreases as the ethylaluminum dichloride (EADC) content of the catalyst increases, relative to magnesium ethylate, MgOC$_2$H$_5$. Table II demonstrates that polymer yield and level of fines can be adjusted by adjusting EADC content.

What is claimed is:

1. An alpha-olefin polymerization catalyst comprising (A) a solid component which is the reaction product of components comprising (1) an alkyaluminum halide and (2) a reaction product prepared by reacting components comprising a magnesium (II) compound and Group IVB or VB amide compound of the general formula M(NR$_2$)$_n$L$_{4-n}$ wherein M is the Group IVB or VB metal, R is an alkyl or aryl group, L is a non-amine ligand and is halogen and n is a number from 1 to 4; and (B) an organometallic promotor selected from the group consisting of Group IA, IIA, IIB, IIIA and IVA metal alkyls, hydrides, alkylhydrides and alkyl halides in an amount which is effective to promote the polymerization activity of said solid component, wherein said solid component is prepared at a temperature within the range of from about 0° to about 250° C. and in relative proportions such that the molar ratio of elemental IVB or VB metal to elemental magnesium ranges from about 0.1:1 to about 10:1.

2. The catalyst according to claim 1 wherein the alkylaluminum halide component contains from 1 to about 20 carbon atoms per alkyl group, the magnesium (II) compound is a alkoxide of the formula Mg(OR$_1$)(OR$_2$) wherein R$_1$ and R$_2$ are the same or different alkyl groups of 1 to about 20 carbon atoms and the Group IVB amide compound is a lower alkyl titanium (IV) amide compound wherein the alkyl group is one to 20 carbon atoms.

3. The catalyst according to claim 1 wherein the organometallic promoter is a Group IA, IIA, IIB, IIIA, or IVA metal alkyl, hydride, alkylhydride, or alkylhalide.

4. The catalyst according to claim 3 wherein the alkylaluminum halide component is an alkylaluminum dichloride and the lower alkyl titanium (IV) amide is a compound having 1 to 6 carbon atoms per alkyl group.

5. The catalyst according to claim 4 wherein the organometallic promoter is a trialkylaluminum compound having from 1 to about 6 carbon atoms per alkyl group and the effective amount of said promoter is at least about 3 parts by weight per part by weight of the solid component.

6. The catalyst according to claim 5 wherein the alkylaluminum dichloride is ethylaluminum dichloride, the lower alkyl magnesium (II) alkoxide is magnesium (II) ethoxide, and the titanium amide compound is tetrakis(diethylamino)titanium (IV).

7. The catalyst according to claim 6 wherein the titanium amide compound and the magnesium alkoxide compound are combined in amounts such that the molar ratio of elemental titanium to elemental magnesium ranges from about 0.1:1 to about 10:1.

8. The catalyst according to claim 6 wherein the trialkylaluminum promoter is triethylaluminum.

9. The catalyst according to claim 6 wherein the trialkylaluminum promoter is triisobutylaluminum.

10. A method for preparing an alpha-olefin polymerization catalyst component comprising a solid component by:
(A) reacting components comprising a magnesium (II) compound and a Group IVB or VB amide compound of the general formula M(NR$_2$)$_n$L$_{4-n}$ wherein M is the Group IVB or VB metal and in relative proportions such that the molar ratio of elemental IVB or VB metal to elemental magnesium ranges from about 0.1:1 to about 10:1, R is an alkyl or aryl group, L is a non-amine ligand and is halogen and n is a number from 1 to 4; and an organometallic promoter selected from the group consisting of Group IA, IIA, IIB, IIIA and IVA metal alkyls, hydrides, alkylhydrides and alkyl halides in an amount which is effective to promote the polymerization activity of said solid component.
(B) reacting said reaction product with an alkylaluminum halide, said alkylaluminum halide being employed in an amount which is effective to halide the titanium and magnesium contained in said reaction product to form said solid catalyst component, wherein said method is performed at a temperature within the range of from about 0° to about 250° C.

11. The method according to claim 10 wherein the alkylaluminum halide component of said catalyst contains from 1 to about 20 carbon atoms per alkyl group, the magnesium (II) compound is a alkoxide of the formula Mg(OR$_1$)(OR$_2$) wherein R$_1$ and R$_2$ are the same or different alkyl groups of 1 to about 20 carbon atoms and the Group IVB amide compound is a lower alkyl titanium (IV) amide compound wherein the alkyl group is one to 20 carbon atoms.

12. The method according to claim 10 wherein the organometallic promoter is a Group IA, IIA, IIB, IIA, or IVA metal alkyl, hydride, alkylhydride, or alkylhalide.

13. The method according to claim 12 wherein the alkylaluminum halide component is an alkylaluminum dichloride and the lower alkyl titanium (IV) amide is a compound having 1 to 6 carbon atoms per alkyl group.

14. The method according to claim 13 wherein the organometallic promoter is a trialkylaluminum compound having from 1 to about 6 carbon atoms per alkyl group and the effective amount of said promoter is at least about 3 parts by weight per part by weight of the solid component.

15. The method according to claim 14 wherein the alkylaluminum dichloride is ethylaluminum dichloride, the lower alkyl magnesium (II) alkoxide is magnesium (II) ethoxide, and the titanium amide compound is tetrakis(diethylamino)titanium (IV).

16. The method according to claim 15 wherein the titanium amide compound and the magnesium alkoxide compound are combined in amounts such that the molar ratio of elemental titanium to elemental magnesium ranges from about 0.1:1 to about 10:1.

17. The method according to claim 15 wherein the trialkylaluminum promoter is triethylaluminum.

18. The method according to claim 15 wherein the trailalkylaluminum promoter is triisobutylaluminum.

* * * * *

UNITED STATES PATENT OFFICE
CERTIFICATE OF CORRECTION

Patent No. 4,211,671          Dated July 8, 1980

Inventor(s) Glen R. Hoff

It is certified that error appears in the above-identified patent and that said Letters Patent are hereby corrected as shown below:

| Patent Column | Line | |
|---|---|---|
| 1 | 38 | "HClmethyl" should be --HCl - methyl-- |
| 2 | 40 | "$M(NR_2)L_{4-n}$" should be --$M(NR_2)_n L_{4-n}$-- |
| 7 | 65 | "60°" should be --60°C-- |
| 10 | 53 | "Group IA, IIA, IIB, IIA" should be --Group IA, IIA, IIB, IIIA-- |

Signed and Sealed this

Sixth Day of January 1981

[SEAL]

Attest:

SIDNEY A. DIAMOND

Attesting Officer      Commissioner of Patents and Trademarks